United States Patent [19]

Mickelson

[11] Patent Number: 4,787,204

[45] Date of Patent: Nov. 29, 1988

[54] COMMON RELIEF VALVE

[75] Inventor: Roger D. Mickelson, West Burlington, Iowa

[73] Assignee: J. I. Case Company, Racine, Wis.

[21] Appl. No.: 101,512

[22] Filed: Sep. 28, 1987

[51] Int. Cl.[4] .............................................. F16D 31/02

[52] U.S. Cl. ......................................... 60/428; 60/486; 417/286

[58] Field of Search ................. 60/428, 468, 494, 427, 60/484, 486; 417/286, 216, 213

[56] References Cited

U.S. PATENT DOCUMENTS

| | | | |
|---|---|---|---|
| 3,720,059 | 3/1973 | Schurawski et al. | 60/427 X |
| 3,922,855 | 12/1975 | Bridwell et al. | 60/428 X |
| 3,924,971 | 12/1975 | Jacquot | 60/486 X |
| 3,955,474 | 5/1976 | Dunn | 60/427 X |
| 3,962,954 | 6/1976 | Jacob et al. | 417/286 X |

*Primary Examiner*—Edward K. Look
*Attorney, Agent, or Firm*—Cullen, Sloman, Cantor, Grauer, Scott & Rutherford

[57] ABSTRACT

A common relief valve circuit for controlling or monitoring two or more pumps. The circuit includes two fixed displacement pumps with the pumps being connected to at least two valve bodies or sections that supply fluid to hydraulic cylinders for operating earthworking buckets or the like. A main relief valve is connected to the inlet of a first valve section, and a check valve is connected in a parallel cavity line in the first valve section. The check valve remains closed under conditions where a valve spool in the first valve section is shifted but a valve spool in the second valve section is not shifted or when a valve spool in the second valve section is shifted and a valve spool in the first valve section is not shifted. If a valve spool in the first valve section is actuated at the same time as a valve spool in the second valve section, fluid pressure downstream of the first valve section is communicated through the check valve and parallel cavity line to the main relief valve, thereby permitting the relief valve to monitor both valve sections and eliminating the need for a separate main relief valve for each valve section.

1 Claim, 1 Drawing Sheet

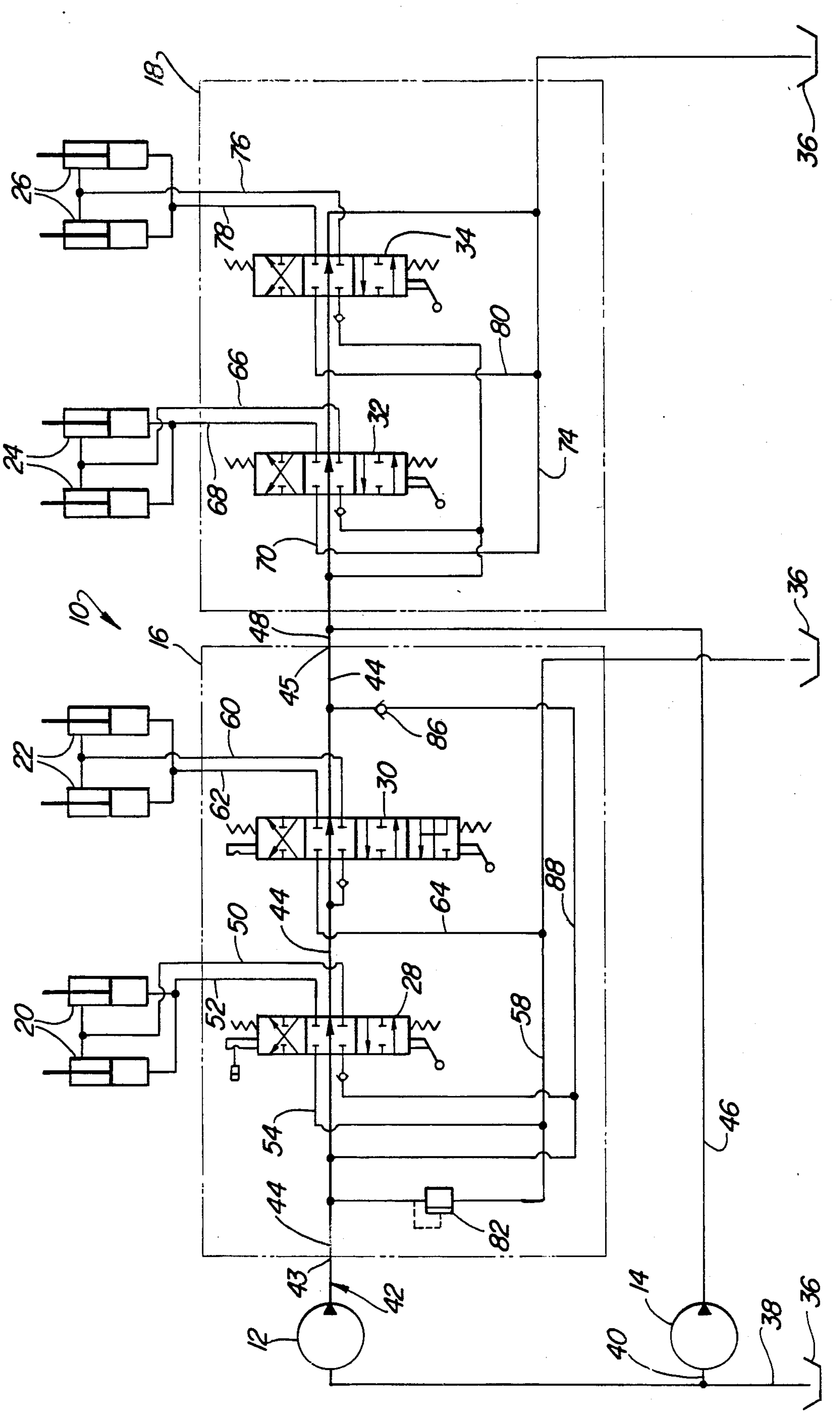
10
12
14
16
18
20
22
24
26
28
30
32
34
36
38
40
42
43
44
45
46
48
50
52
54
58
60
62
64
66
68
70
74
76
78
80
82
86
88

COMMON RELIEF VALVE

BACKGROUND OF THE INVENTION

The present invention relates to a hydraulic circuit including multiple pumps and valve sections wherein a single main relief valve is utilized for pressure control in the circuit.

It is common in earth-working equipment, such as backhoes, front end loaders and the like, to have a bucket or shovel mounted on a tractor to be raised and lowered, tilted, or otherwise moved into the correct attitude by an appropriate mechanism for the work being performed. Such movements of the bucket, shovel or backhoe are commonly made by hydraulic cylinders supplied with fluid pressure from a suitable pump and valve arrangement.

Since a common mode of operation in earth-working is to move a bucket or the like into a pile of material, the hydraulic system for such earth-working applications may periodically require a high volume of fluid at low pressure to rapidly move the cylinder piston rods and, therefore, the bucket or the like to the work. Thereafter, low fluid volume under higher pressure may be required to provide the necessary movement of the bucket to break a portion of the material loose from a work pile or to lift the material after it is in the bucket.

A prior art approach for meeting the variable fluid demands in earth-working operations has been to provide two fixed displacement pumps to supply the required fluid under pressure for the hydraulic circuit. For example, in an application such as a loader-backhoe, a first pump flow is provided to the loader valve circuit, and the pump flow not used for the loader is combined with a second pump flow to supply the backhoe valve circuit. While the use of multiple fixed displacement pumps and valve circuits permits a more efficient system, a corresponding number of relief valves are required to provide pressure control for the multiple pump and valve arrangement.

Thus, the present invention is directed to a hydraulic circuit which eliminates the need for multiple relief valves in a system including multiple fixed displacement pumps and valve sections.

SUMMARY OF THE INVENTION

In accordance with the present invention, a hydraulic circuit is disclosed including multiple fixed displacement pumps and multiple valve sections associated therewith wherein a single main relief valve monitors the multiple valve sections.

The disclosed hydraulic circuit includes two fixed displacement pumps with the pumps being connected to at least two valve bodies or sections that supply fluid to hydraulic cylinders for operating earth-working buckets, backhoes, or the like. The discharge flow of one of the pumps is directed to a first valve body having multiple valve spools. If none of the valve spools are actuated, the flow from the pump passes through the open center of the valve body where it is combined with the flow from the second pump and is directed to a second valve body that also includes multiple valve spools.

The present invention more specifically relates to an arrangement wherein a single main relief valve controls or services both valve sections. The relief valve is connected to the inlet of the first valve body. The relief valve is also in fluid communication with the high pressure carry-over port of the first valve section if none of the valve spools in the first valve section are shifted from a non-actuated position. However, if one of the valve spools in the first valve section is shifted, the relief valve would not normally be in fluid communication with the valve spools in the second valve body or section. Thus, a check valve has been connected in a parallel cavity line in the first valve body which allows fluid communication to the relief valve from a lcoation downstream of the high pressure carry-over port, thereby eliminating the need for a separate relief valve for the second valve section.

The check valve normally remains closed under normal conditions when one of the valve spools in the second valve body is shifted but none of the valve spools in the first valve body is shifted or when one of the valve spools in the first valve body is shifted but none of the valve spools in the second valve body is shifted. Under these conditions, the flow of the first pump passes through the open cavity of the first valve body to join with the flow of the second pump to the second valve body. If, however, one of the valve spools in the first valve body is actuated at the same time as one of the valve spools in the second valve body, fluid pressure downstream of the high pressure carry-over port is communicated through the check valve and parallel cavity line to the relief valve, thereby permitting the relief valve to monitor both valve sections.

Other advantages and meritorious features of the present invention will be more fully understood from the following description of the invention, the appended claims, and the drawing, a brief description of which follows.

BRIEF DESCRIPTION OF DRAWING

The single FIGURE drawing is an illustration of the common relief valve circuit of the present invention.

DETAILED DESCRIPTION OF THE INVENTION

A preferred embodiment of the common relief valve circuit of the present invention is illustrated in the single FIGURE drawing.

The hydraulic circuit 10 includes two fixed displacement pumps 12 and 14 which are connected to valve bodies or sections 16 and 18. Valve section 16 may be used to control pairs of hydraulic cylinders 20 and 22 which are in association with a bucket or the like while valve section 18 may be used to control hydraulic cylinders 24 and 26 which are associated with a backhoe or the like. Each valve body 16 and 18 includes valve spools which are are in fluid communication with the respective hydraulic cylinders such as, for example, valve spools 28 and 30 in valve body 16 and valve spools 32 and 34 in valve body 18.

The inlets of pumps 12 and 14 are connected to fluid reservoir 36 by means of fluid lines 38 and 40. The discharge flow of pump 12 is directed to valve body 16 and to valve spools 28 and 30 through conduit 42. If valve spools 28 and 30 are in a neutral or non-actuated position, as illustrated, the flow from pump 12 passes through the inlet 43 and open center cavity 44 of valve body 16 to the high pressure carry-over port 45, as is conventional. The discharge flow of pump 14 is directed through fluid line 46 to fluid line 48 where it is combined with the flow from pump 12 when valves 28 and 30 are not actuated. The combined pump flow is directed to valve body 18 and to valve spools 32 and 34 through fluid line 48.

Valve spool 28 directs fluid to piston cylinders 20 through lines 50 and 52 while returning fluid to reservoir 36 through cavities 54 and 58. Valve spool 30 directs fluid to and from piston cylinders 22 through lines 60 and 62 with the returning fluid passing through cavities 64 and 58 to reservoir 36. Similarly, valve spools 32 and 34 direct fluid to and from piston cylinders 24 and 26 through fluid lines 66–80. The operation of valve spools 28–34 and piston cylinders 20–26 is conventional and well-known by those skilled in the art.

The present invention more specifically relates to an arrangement wherein a single main relief valve 82 controls or services both pumps 12 and 14. Relief valve 82 is connected to the inlet 43 to valve body 16. Valve 82 is also in fluid communication with the high pressure carry-over port 45 if valve spools 28 and 30 are not shifted from the position illustrated in the drawing. However, if either spool 28 or 30 is shifted, relief valve 82 would not normally be in fluid communication with the valve spools 32 and 34 downstream of high pressure carry-over port 45. Thus, a check valve 86 is connected in a parallel cavity line 88 in valve body 16 which allows fluid communication to the relief valve 82 from a location downstream of the high pressure carry-over port 45, thereby eliminating the need for a separate relief valve for pump 14.

In operation, check valve 86 remains closed under normal conditions such as, for example, when one of the valve spools 32 or 34 is shifted but neither of the valve spools 28 and 30 is shifted or when one of the valve spools 28 and 30 is shifted but neither of the valve spools 32 and 34 is shifted. Under the former of these two sets of conditions, the flow of pump 12 passes through the open center cavity 44 of valve body 16 to join with the flow from pump 14 to valve body 18. If, however, one of the valve spools 28 and 30 is actuated at the same time as one of the valve spools 32 and 34, fluid pressure downstream of the high pressure carry-over port 45 is communicated through check valve 86 and parallel cavity line 88 to relief valve 82, thereby permitting relief valve 82 to monitor both valve section 16 and valve section 18.

It will be apparent to those skilled in the art that the foregoing disclosure is exemplary in nature rather than limiting, the invention being defined by the appended claim.

I claim:

1. A common relief valve circuit comprising:

a first fixed displacement pump connected between a reservoir and a first valve body having a plurality of first movable valve spools therein which direct fluid to a plurality of piston cylinders, said first valve body including an inlet port, an open center cavity, and an outlet port, and the discharge flow from said first pump being directed through said inlet port and open center cavity to said outlet port when said first valve spools are not actuated;

a second fixed displacement pump connected between said reservoir and a second valve body having a plurality of second movable valve spools therein which direct fluid to a plurality of piston cylinders, said second pump being in fluid communication with the outlet port of said first valve body, and the discharge flow from said second pump being combined with the discharge flow of said first pump when said first valve spools are not actuated;

a main relief valve connected between the inlet port of said first valve body and said reservoir, and said relief valve being in fluid communication with said outlet port of said first valve body when the first valve spools are not actuated;

a parallel cavity line in said first valve body in fluid communication between said relief valve and said outlet port, and a check valve connected in said parallel cavity line; and said check valve remaining closed when only one of said first or second valve spools are actuated, and fluid pressure from a location downstream of said first valve body outlet port being communicated to said relief valve through said parallel cavity line when both one of said first valve spools and one of said second valve spools are actuated

* * * * *

UNITED STATES PATENT AND TRADEMARK OFFICE

CERTIFICATE OF CORRECTION

PATENT NO. : 4,787,204

DATED : November 29, 1988

INVENTOR(S) : Mickelson

It is certified that error appears in the above-identified patent and that said Letters Patent is hereby corrected as shown below:

In column 4, line 28, "main" should be changed to --single--.

Signed and Sealed this

Twenty-fifth Day of April, 1989

*Attest:*

DONALD J. QUIGG

*Attesting Officer*

*Commissioner of Patents and Trademarks*